US006831500B2

(12) United States Patent
Sato et al.

(10) Patent No.: US 6,831,500 B2
(45) Date of Patent: Dec. 14, 2004

(54) NOISE-REDUCED VOLTAGE BOOSTING CIRCUIT

(75) Inventors: Tomohiko Sato, Tokyo (JP); Kazutaka Miyano, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

(21) Appl. No.: 10/694,526

(22) Filed: Oct. 27, 2003

(65) Prior Publication Data

US 2004/0130384 A1 Jul. 8, 2004

(30) Foreign Application Priority Data

Oct. 25, 2002 (JP) ........................................ 2002-311244

(51) Int. Cl.[7] .............................. G05F 1/10; G05F 3/02
(52) U.S. Cl. ..................................................... 327/536
(58) Field of Search ................................ 327/536, 589; 323/59–60; 365/226

(56) References Cited

U.S. PATENT DOCUMENTS

| 6,765,428 B2 | * | 7/2004 | Kim et al. ................... 327/534 |
| 2003/0107428 A1 | * | 6/2003 | Khouri et al. ............... 327/536 |
| 2003/0146782 A1 | * | 8/2003 | Ito .............................. 327/536 |

FOREIGN PATENT DOCUMENTS

| JP | 9-320268 | 12/1997 |
| JP | 11-025673 | 1/1999 |
| JP | 2000-100184 | 4/2000 |
| JP | 2000-173266 | 6/2000 |
| JP | 2000-331489 | 11/2000 |

* cited by examiner

Primary Examiner—Quan Tra
(74) Attorney, Agent, or Firm—Katten Muchin Zavis Rosenman

(57) ABSTRACT

A voltage boosting circuit in which a changing rate of current is limited to reduce noise. An oscillator circuit sends a plurality of oscillating signals differing in edge timing from each other. An enable circuit counts the number of the edges of at least one of the oscillating signals from a start of a boosting operation, and generates an enable signal for instructing a boosting power control circuit to reduce the boosting power of the corresponding one of pumping circuits until the count value becomes a set value. The boosting power control circuit controls the boosting power of each pumping circuit in response to the enable signal. Each pumping circuit performs a boosting operation by charging and discharging a pumping capacitor by using the corresponding one of the oscillated signals. The pumping circuits generate a boosted voltage by combining their outputs signals.

6 Claims, 13 Drawing Sheets

NOISE-REDUCED VOLTAGE BOOSTING CIRCUIT

BACKGROUND OF THE INVENTION

1. Field of the Invention

The present invention relates generally to semiconductor circuit devices and, more particularly, to a voltage boosting circuit incorporated in a semiconductor circuit device.

2. Description of the Related Art

In recent years, there have been provided dynamic random access memories (DRAMs) which have a voltage boosting circuit in a chip and In which memory cells are driven through word lines or other wiring by using a voltage boosted by the voltage boosting circuit. There has been a challenge to reduce current noise in this kind of voltage boosting circuit. Conventional voltage boosting circuits designed to reduce current noise and to obtain a sufficiently high boosted voltage include an oscillator circuit which generates a plurality of oscillating signals having different timing from each other and a plurality of pumping circuits each having a capacitor of a small capacitance and transistors of a small size in corresponding to the respective oscillating signals.

FIG. 1 is a circuit diagram showing a conventional voltage boosting circuit. Referring to FIG. 1, boosting circuit 100 has oscillator circuit 120, oscillator output signal latch circuit 130, pumping circuit 140, and boosted voltage level determination circuit 150. Each of these circuits has the ground level as a reference potential and operates by an external power supply voltage VCC.

Oscillator output signal latch circuit 130 includes φ1 latch circuit 131, φ2 latch circuit 132, . . . , and φn latch circuit 13n. Pumping circuit 140 includes φ1 pumping circuit 141, φ2 pumping circuit 142, . . . , and φn pumping circuit 14n.

Signals φ1–φn sent from oscillator circuit 120 are respectively given to φ1–φn latch circuits 131–13n. Signals φ1A–φnA respectively sent from φ1–φn latch circuits 131–13n are respectively given to φ1–φn pumping circuits 141–14n. The outputs of φ1–φn pumping circuits 141–14n are connected to a common point, at which a boosted voltage VPP is generated. A signal VPUP sent from boosted level determination circuit 150 is given to oscillator circuit 120 and to the φ1–φn latch circuits 131–13n.

A desired voltage to be obtained by boosting is set in boosting circuit 100. Boosted level determination circuit 150 compares the boosted voltage VPP provided from the boosting circuit 100 with a set voltage sets the signal VPUP to "H" when the boosted voltage VPP is lower than the set voltage, and sets the signal VPUP to "L" when the boosted voltage VPP is higher than the set voltage.

Oscillator circuit 120 sends a plurality of oscillating signals one after another at equally shifted times when the signal VPUP Is at "H". For example, oscillator circuit 120 has inverters forming n stages (n: an odd number) connected in a chain configuration. Oscillator circuit 120 sends no oscillating signal when the signal VPUP is at "L".

FIG. 2 is a circuit diagram showing an example of a basic configuration of the oscillator circuit. Referring to FIG. 2, Oscillator circuit 120 has a basic configuration in which odd number of inverters being connected in a ring-like chain. The inverters send signals φ1–φn. In FIG. 2, a circuit portion relating to signal VPUP is not shown.

FIG. 3 is a timing chart showing the waveforms of signals φ1–φn. Referring to FIG. 3, signals φ1–φn are oscillating signals which have transition timings successively shifted and phases alternately reversed. The cycle of each of signals φ1–φn is T. The time between edges of the adjacent signals, e.g., between the rising edge of the signal φ1 and the falling edge of signal φ2 is dT=T/(2×n), which is the waveform transmission time by the inverters.

Each of φ1–φn latch circuits 131–13constituting oscillator output signal latch circuit 130 uses signal VPUP as an enable signal. φ1–φn latch circuits 131–13n send signals φ1–φn respectively as signals φ1A–φnA when signal VPUP is at "H". At this time, signals φ1A–φnA are respectively in phase with signals φ1–φn. φ1–φn latch circuits 131–13n hold the states of signals φ1A–φnA when signal VPUP is at "L".

φ1–φn pumping circuits 141–14n constituting the pumping circuit 140 are respectively supplied with signals φ1–φnA and perform boosting operations in synchronization with signals φA–φnA. The output terminals of the φ1–φn pumping circuits 141–14n are connected to the common point, i.e., the output terminal of pumping circuit 140, through which boosted voltage VPP is output.

FIG. 4 is a circuit diagram showing an example of the configuration of φ1–φn pumping circuits. All of φ1–φn pumping circuits are identical in configuration. In FIG. 4, φ1 pumping circuit is shown as a representative. Referring to FIG. 4, φ1 pumping circuit is constituted by inverters INV0 and INV1, capacitor C0, and diodes DI0 and DI1.

Signal φ1A is given to inverter INV0. Inverters INV0 and INV1 are connected in series. The output terminal of inverter INV1 and one terminal of capacitor C0 are connected to each other at a connection point A. The other terminal of the capacitor C0, the cathode of diode DI0 and the anode of diode DI1 are connected to each other at a connection point B. External power supply voltage VCC is supplied to the anode of diode DI0. The cathodes of diodes DI1 of φ1–φn pumping circuits 141–14n are connected to the common point through which boosted voltage VPP is output.

FIG. 5 is a timing chart showing the boosting operation of φ1 pumping circuit shown in FIG. 4. Referring to FIG. 5, signal φ1A is an oscillating signal having external power supply voltage VCC and reference voltage GND alternately sent. The signal waveform at the connection point A is slightly delayed from signal φ1A.

When the potential at the connection point A is reference voltage GND level, the connection point B is precharged to external power supply voltage VCC through diode DI0. When a transition from reference voltage GND to external power supply voltage VCC is effected at the connection point A, the potential at the connection point B is increased by an amount corresponding to external power supply voltage VCC due to the coupling through capacitor C0. Accordingly, a transition of the potential at the connection point B is made from external power supply voltage VCC to a voltage (2×VCC) twice external power supply voltage VCC. Thus, φ1 pumping circuit 141 can generate boosted voltage VPP higher than external power supply voltage VCC. The circuit for control of diodes DI0 and DI1 shown in FIG. 4 is not illustrated.

In general, the inverter is made by combining a Pch transistor (not shown) and an Nch transistor (not shown). Capacitor C0 is charged by supply of a current caused by external power supply voltage VCC to flow through the Pch transistor of inverter INV1. Capacitor C0 is discharged by the flow of a current from the connection point A to reference voltage GND through the Nch transistor of inverter INV1.

Similarly, the connection point B is precharged to external power supply voltage VCC by supply of a current caused by external power supply voltage VCC to flow to the connection point B through diode DI0.

The gate capacity of inverter INV1 is charged and discharged by a charge current caused by external power supply voltage VCC to flow from inverter INV0 to inverter INV1 and a discharge current caused to flow from inverter INV1 to reference voltage GND.

In the voltage boosting circuit, noise is caused due to the charge current from external power supply voltage VCC and the discharge current to reference voltage GND.

An electric charge which can be sent from the φ1 pumping circuit for boosting is determined by the capacitance of capacitor C0. It is necessary that the sizes of the transistors constituting inverters INV1 and INV0 and diodes DI0 and DI1, which drives e capacitor C0, are determined such that capacitor C0 can be efficiently charged and discharged. To obtain suitable boosted signal VPP, the pumping power could be increased, and a large pumping capacitor and large transistors for a circuit such as inverter for driving the capacitor could be used. In such a case, however, charge/discharge current noise of capacitor CO would be increased.

To obtain a sufficiently high boosting effect while limiting current noise, the voltage boosting circuit shown in FIG. 1 is arranged in such a manner that oscillator circuit 120 has a plurality of outputs and a plurality of φ1–φn pumping circuits 141–14n each having a capacitor of a small capacitance and transistors of a small size are provided.

Description will be made of the operation of the conventional voltage boosting circuit.

FIG. 6 is a timing chart for explaining the operation of the conventional voltage boosting circuit. FIG. 6 shows the waveforms of signal VPUP, signals φ1–φn sent from oscillator circuit 120 and signals φ1A–φn sent from latch circuits 131–13n.

Referring to FIG. 6, signals φ1–φn and φ1A–φnA are maintained at a constant value and do not make no transition at time T0 since signal VPUP is at "L".

Signal VPUP makes a transition from "L" to "H" in the time period from time T0 to time Ts to start an initialization operation of the voltage boosting circuit.

When the initialization operation of the voltage boosting circuit is started, oscillator circuit 120 sends n oscillating signals, at times successively shifted by the time period corresponding to cycle T. The length of each of time periods Ta and Tb in FIG. 6 is equal to cycle T.

Signals φ1–φn are supplied respectively as signals φ1A–φnA to pumping circuit 140 by latch circuits 131–13n in oscillator output signal latch circuit 130. φ1–φn pumping circuits 141–14n constituting the pumping circuit 140 perform the boosting operations in response to the transitions of signals φ1A–φnA. The outputs from the φ1–φn pumping circuits 141–14n ar combined to supply boosted voltage VPP to the outside. Signals φ1A–φnA each make transitions from reference potential GND to external power supply voltage VCC at different times, so that no coincidence of current noise peaks occurs.

FIG. 7 is a timing chart showing the operation of the conventional voltage boosting circuit and the waveform of the output signal. FIG. 7 illustrates a case where n=5 and where pumping circuits each configured with two of the circuit that shown in FIG. 4 so that the boosting circuit operates not only at the time of transition from reference voltage GND to external power supply voltage VCC but also at the time of transition from external power supply voltage VCC to reference voltage GND.

In the lower section of FIG. 7, the waveforms of signal VPUP and signals φ1A–φ5A are shown. In the upper section of FIG. 7, currents I (solid line) sent from φ1–φn pumping circuits 141–14n and a current Itotal (dotted line) obtained by combining currents I are shown.

Referring to FIG. 7, signal VPUP makes a transition from "L" to "H" in the time period from time T0 to time T1 to start the boosting operation. At time T1, signal φ1A makes a transition from GND to VCC. Subsequently, signals φ2A–φ5A make transitions one after another at intervals of time T2−T1=dT=(one cycle T)/(2×5). Thereafter, signals φ1A–φ5A make transitions alternately to GND and VCC at times shifted by dT. As can be understood from FIG. 7, the transition waveforms of the odd-numbered signals φ1A, φ3A, and φ5A are in reversed phase with respect to those of the even-numbered signals φ2A and φ4A.

In response to the transitions of signals φ1A–φnA, transitions of currents I (solid line) output from φ1–φn pumping circuits 141–14n are made. Current Itotal (dotted line) obtained by combining the outputs from the φ1–φn pumping circuits 141–14n rises during the time period from T1 to T4 and is generally constant after time T5. Current Itotal after time T5 is a saturated consumption current I0. The consumption current at the time of starting of the pumping circuit when signal VPUP makes a transition from "L" to "H" has a current changing rate dI/dT in the time period from T1 to T4, which is considered to be a noise source. This is because, if the current changing rate dI/dT is large, noise due to the inductance of wiring including the lead frame of the semiconductor device is large.

Another conventional voltage boosting circuit, e.g., one described in Japanese Patent Laid-Open No. 11-25673 has a delay circuit which generates signals corresponding to signals φ1A–φnA shown in FIG. 1.

A further conventional voltage boosting circuit has two operating modes: a standby mode and an active mode (e.g., Japanese Patent Laid-Open No. 9-320268). In this kind of voltage boosting circuit, one of the two operating modes is selected according to the amount of electric charge to be supplied.

The voltage boosting circuit described in Japanese Patent Laid-Open No. 9-320268 has a plurality of pumping circuits. In the standby mode, only part of the pumping circuits are successively operated. In the active mode, all the pumping circuits are continuously operated.

The above-described conventional arts have problems described below.

The conventional voltage boosting circuit shown in FIG. 1 is arranged to reduce current noise in such a manner that oscillator circuit 120 has a plurality of outputs and pumping circuit 140 is constituted by φ1–φn pumping circuits 141–14n having a capacitor of a small capacitance and transistors of a small size. After a lapse of a certain length of time from a start of the operation, therefore, the current value becomes generally constant and the current changing rate dI/dT becomes zero, as shown in FIG. 7. Thus, noise due to the current changing rate dI/dT becomes zero.

However, when the pumping operation is started, the rate of change in current (dI/dT) of the conventional boosting circuit is high, as shown in FIG. 7. An abrupt current change (dI/dT) of external power supply voltage VCC or reference voltage GND can cause noise by a self-inductance or a mutual inductance.

In semiconductor circuit devices such as DRAMs, a lead frame and bonding wires for connection between pins and a chip exist. Also, wires for external power supply voltage VCC and reference voltage GND exist adjacent to wires to address and data pins or the like. Therefore, the characteristics of input of addresses, data or the like are degraded by the noise from the wires.

In the conventional voltage boosting circuit described in Japanese Patent Laid-Open No. 11-25673, a delay circuit is used. The delay time of the delay circuit, however, varies under the influence of manufacturing process variations. In the voltage boosting circuit arranged as described in Japanese Patent Laid-Open No. 11-25673, therefore, there is a possibility of nonuniformity of the currents consumed by the pumping circuits during one cycle of the oscillation signals generated by the oscillator. The output of the oscillator circuit described in Japanese Patent Laid-Open No. 11-25673 is a signal taken out from one point and is supplied to the pumping circuits with delays added by the delay circuit. The signal passed through the delay circuit is susceptible to the influence of the above-mentioned process variations, there is a tendency toward nonuniformity in the time periods during which the pumping operations are performed in one oscillating cycle, and it is difficult to perform control with accuracy. In some cases, therefore, failure to control the current changing rate dI/dT within the desired gradient range occurs, which is a cause of generation of noise. There is a possibility of the current changing rate dI/dT becoming considerably large at the time of starting of the operation in particular.

The conventional voltage boosting circuit described in Japanese Patent Laid-Open No. 9-320268 has the two operating modes, i.e., the standby mode and the active mode, for the boosting operation. This voltage boosting circuit controls the current supply capacity by changing the number of pumping circuits with respect to different consumption currents from VPP in the operating modes. However, the operation of this voltage boosting circuit at the time of starting of the operation is the same as that of the voltage boosting circuit shown in FIG. 1, In that the pumping circuits (pumping means) perform boosting at times successively shifted by the delay circuit (delay element). Therefore, the changing rate dI/dT in consumption current at the time of starting of the voltage boosting circuit described in Japanese Patent Laid-Open No. 9-320268 is as steep as the changing dI/dT in current Itotal shown in FIG. 7.

SUMMARY OF THE INVENTION

An object of the present invention is to provide a voltage boosting circuit in which an abrupt change in current at the time of starting of the operation is limited to reduce noise.

To achieve the above-described object, according to the present invention, there is provided a voltage boosting circuit having an oscillator circuit, a pumping circuit, a boosting power control circuit and an enable circuit. The oscillator circuit outputs a plurality of oscillating signals differing in edge timing from each other. A plurality of pumping circuits are provided in correspondence with oscillating signals. Each pumping circuit performs a boosting operation by charging and discharging a pumping capacitor by using the corresponding one of the oscillating signals. The pumping circuits generate a boosted voltage by combining their outputs signals. The boosting power control circuit controls the boosting power of each pumping circuit according to an enable signal. An enable circuit counts the number of edges of at least one of the oscillating signals, and generates the enable signal to instruct the boosting power control circuit to reduce the boosting power of the pumping circuit until the count value becomes a set value.

According to the present invention, the boosting power of at least one of the plurality of pumping circuits for performing boosting operations by a plurality of oscillated signals is restricted for several cycles of the signal after a start of the boosting operation by the enable circuit and the boosting power control circuit. A rate of a change in the current for the boosting operation is thereby reduced to suppress noise accompanying the change in the current.

The above and other objects, features, and advantages of the present invention will become apparent from the following description with references to the accompanying drawings which illustrate examples of the present invention.

DETAILED DESCRIPTION OF THE PREFERRED EMBODIMENTS

An embodiment of the present invention will be described in detail with reference to the accompanying drawings.

Figure 8:
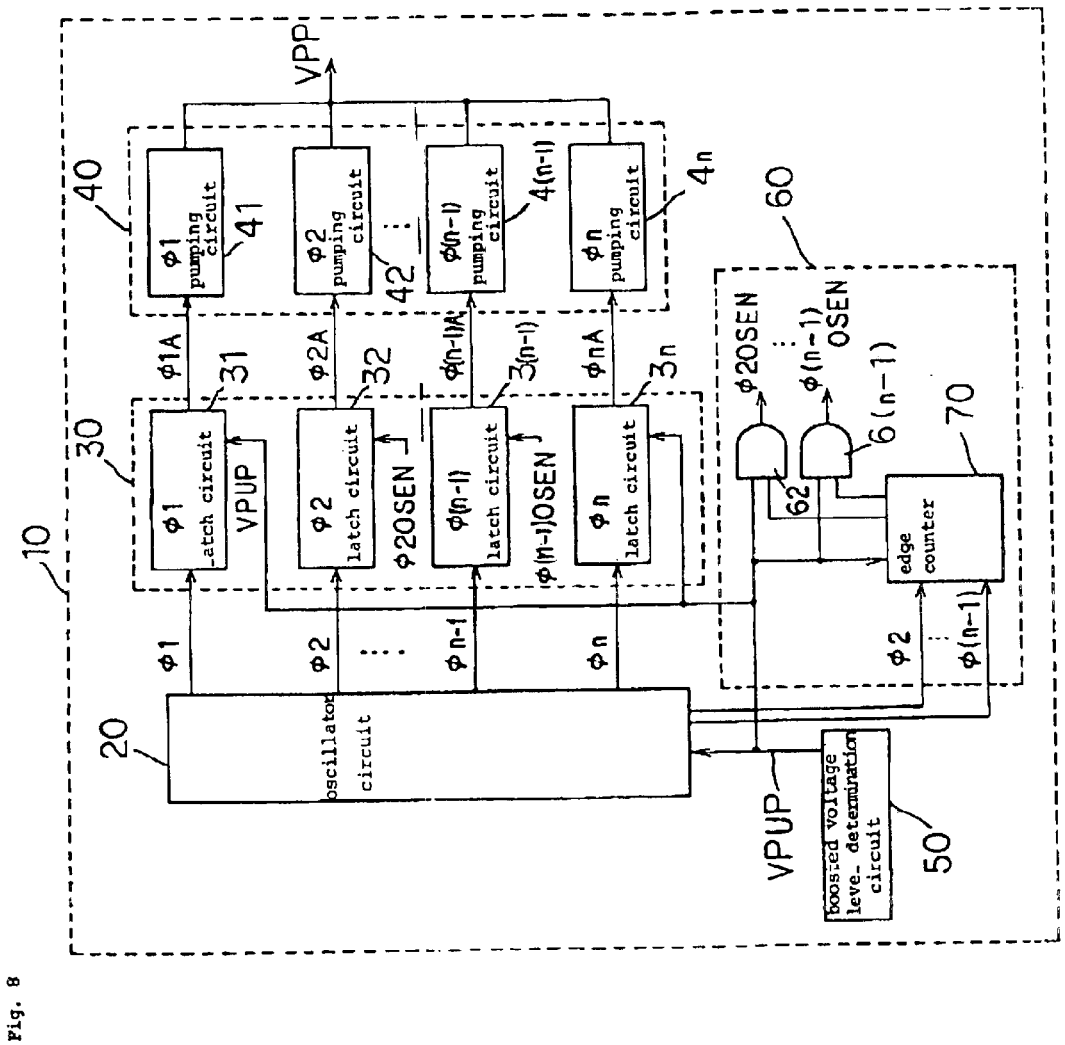
FIG. 8 is a circuit diagram showing the configuration of a voltage boosting circuit in an embodiment of the present invention.

FIG. 8 is a circuit diagram showing a voltage boosting circuit in an embodiment of the present invention. Referring to FIG. 8, boosting circuit 10 has oscillator circuit 20, oscillator output signal latch circuit 30, pumping circuit 40, boosted voltage level determination circuit 50, and enable circuit 60. Each of these circuits operates by a reference potential GND and an external power supply voltage VCC.

Oscillator output signal latch circuit 30 includes φ1 latch circuit 31, 12 latch circuit 32, . . . , and φn latch circuit 3, where n is an odd number. Pumping circuit 40 includes φ1 pumping circuit 41, φ2 pumping circuit 42, . . . , and φn pumping circuit 4n.

Enable circuit 60 has edge counter 70 and AND gates 62–6(n–1).

Signals φ1–φn sent from oscillator circuit 20 are respectively given to the φ1–φn latch circuits 31–3n. The signals φ2–φ(n–1) are also input to edge counter 70. Signals φ1A–φnA respectively sent from φ1–φn latch circuits 31–3n are respectively given to φ1–φn pumping circuits 41–4n. Outputs of φ1–φn pumping circuits 41–4n are connected to a common point, at which a boosted voltage VPP is generated. A signal VPUP sent from boosted level determination circuit 50 is input to the oscillator circuit 20, φ1–φn latch circuits 131–13n, edge counter 70 and AND gates 62–6(n–1).

A desired voltage to be obtained by boosting is set in boosting circuit 10.

Boosted level determination circuit 50 compares the boosted voltage VPP with a set voltage, sets the signal VPUP to "H" when the boosted voltage VPP is lower than the set voltage, and sets the signal VPUP to "L" when the boosted voltage VPP is higher than the set voltage.

Oscillator circuit 20 sends a plurality of oscillated signals one after another at equally shifted times when the signal VPUP is at "H". For example, oscillator circuit 20 has inverters forming an odd number of stages by being connected in a chain configuration. Oscillator circuit 20 sends no oscillating signal when the signal VPUP is at "L".

Figure 9:
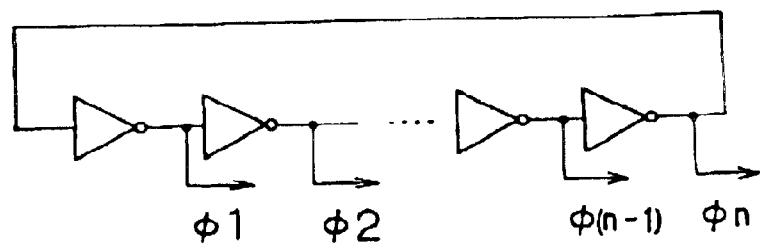
FIG. 9 is a circuit diagram showing an example of a basic configuration of an oscillator circuit.

FIG. 9 is a circuit diagram showing an example of a basic configuration of the oscillator circuit. Referring to FIG. 9, oscillator circuit 20 has a basic configuration in which inverters forming an odd number of stages are connected in a ring-like chain. The inverters send signals φ1–φn to oscillator output signal latch circuit 30 and to enable circuit 60. The number of inverter stages only have to be an odd number; n may be, but not limited to, 3, 5 or 7. In FIG. 9, a circuit portion relating to signal VPUP is not shown.

Figure 10:
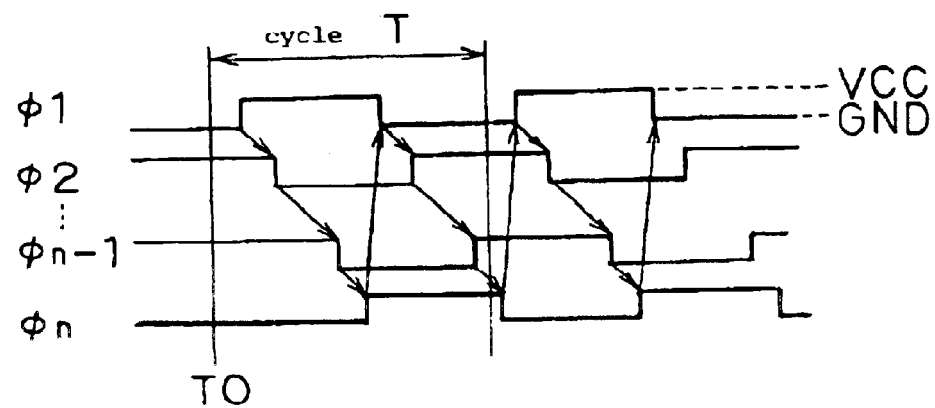
FIG. 10 is a timing chart showing the waveforms of oscillating signals sent from the oscillator circuit.

FIG. 10 is a timing chart showing the waveforms of signals φ1–φn. Referring to FIG. 10, signals φ1–φn are oscillated signals which have transition timings successively shifted and phase alternately reversed. The cycle of each of signals φ1–φn is T. The time between edges of the adjacent signals, e.g., between the rising edge of the signal φ1 and the falling edge of signal φ2 is dT=T/(2×n), which is the waveform transmission time of one stage of the inverters.

Each of φ1 and φn latch circuits 31 and 3n constituting oscillator output signal latch circuit 30 uses signal VPUP as an enable signal. φ2–φ(n–1) latch circuits 32–3(n–1) use signals φ2OSEN–φ(n–1)OSEN as enable signals. φ1–φn latch circuits 31–3n send signals φ1–φn as signals φ1A–φnA when the enable signal is at "H". At this time, signals φ1A–φnA are in phase respectively with signals φ1–φn. φ1–φn latch circuits 31–3n hold the states when the enable signal is at "L". The number of latch stages in φ1–φn latch circuits 31–3n may be freely selected and may be either an odd number or an even number.

Oscillator output signal latch circuit 30 controls the boosting power of pumping circuit 40 in a reduction manner by delaying the supply of signals φ2A–φ(n–1)A to pumping circuit 40 by the time period corresponding to several cycles in a transient state at the time of starting of boosting.

φ1–φn pumping circuits 41–4n constituting pumping circuit 40 are respectively supplied with signals φ1A–φnA and perform boosting operations in synchronization with signals φ1A–φnA. Output terminals of the φ1–φn pumping circuits 41–4n are connected to the common point, i.e., the output terminal of pumping circuit 40, through which boosted voltage VPP is output.

Figure 11:
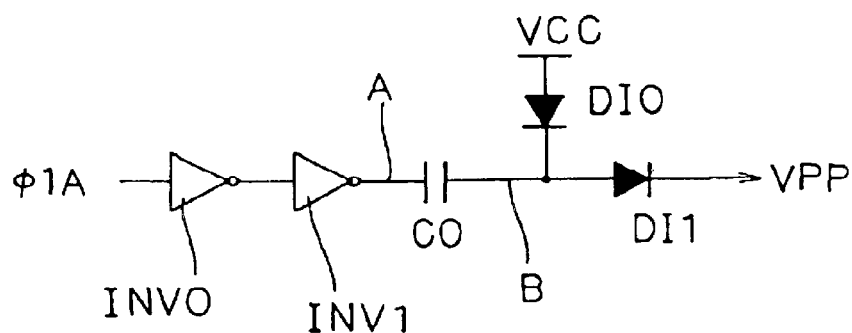
FIG. 11 is a circuit diagram showing an example of the configuration of each of pumping circuits.

FIG. 11 is a circuit diagram showing an example of the configuration of the φ1–φn pumping circuits. All the φ1–φn pumping circuits are identical in configuration. In FIG. 11, the φ1 pumping circuit is shown as a representative. Referring to FIG. 11, the φ1 pumping circuit is constituted by inverters INV0 and INV1, capacitor C0, and diodes DI0 and DI1. The capacitor C0 is a pumping capacitor for performing the boosting operation by pumping.

Signal φ1A is given to inverter INV0. Inverters INV0 and INV1 are connected in series. The output terminal of inverter INV1 and one terminal of capacitor C0 are connected to each other at a connection point A. The other terminal of capacitor C0, the cathode of diode DI0 and the anode of diode DI1 are connected to each other at a connection point B. External power supply voltage VCC is supplied to the anode of diode DI0. The cathodes of diodes DI1 of φ1–φn pumping circuits 41–4n are connected to the common point through which boosted voltage VPP is output.

Figure 12:
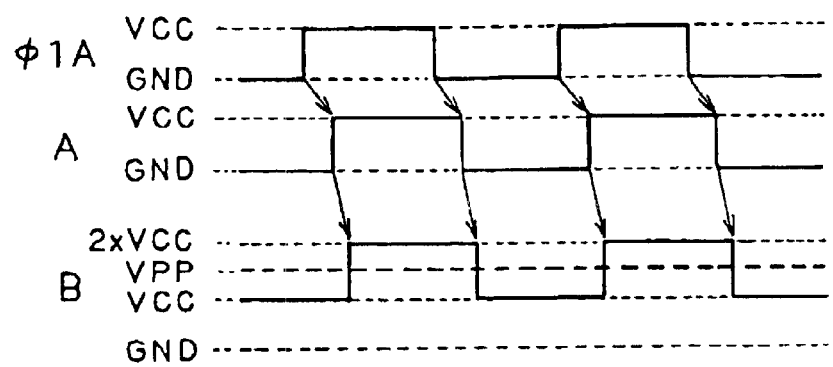
FIG. 12 is a timing chart showing the boosting operation of the pumping circuit shown in FIG. 11.

FIG. 12 is a timing chart showing the boosting operation of the φ1 pumping circuit shown in FIG. 11. Referring to FIG. 12, signal φ1A is an oscillating signal having external power supply voltage VCC and reference voltage GND alternately sent. The signal waveform at the connection point A is slightly delayed from signal φ1A.

When the potential at the connection point A is reference voltage GND level, the connection point B is precharged to external power supply voltage VCC through diode DI0. When a transition from reference voltage GND to external power supply voltage VCC is effected at the connection point A, capacitor C0 at the connection point B is increased by an amount corresponding to the difference in amplitude between GND and VCC. Accordingly, transitions of the potential at the connection point B are alternately made to external power supply voltage VCC and a voltage (2×VCC) twice external power supply voltage VCC. Thus, φ1 pumping circuit 41 can generate boosted voltage VPP higher than external power supply voltage VCC.

Figure 13:
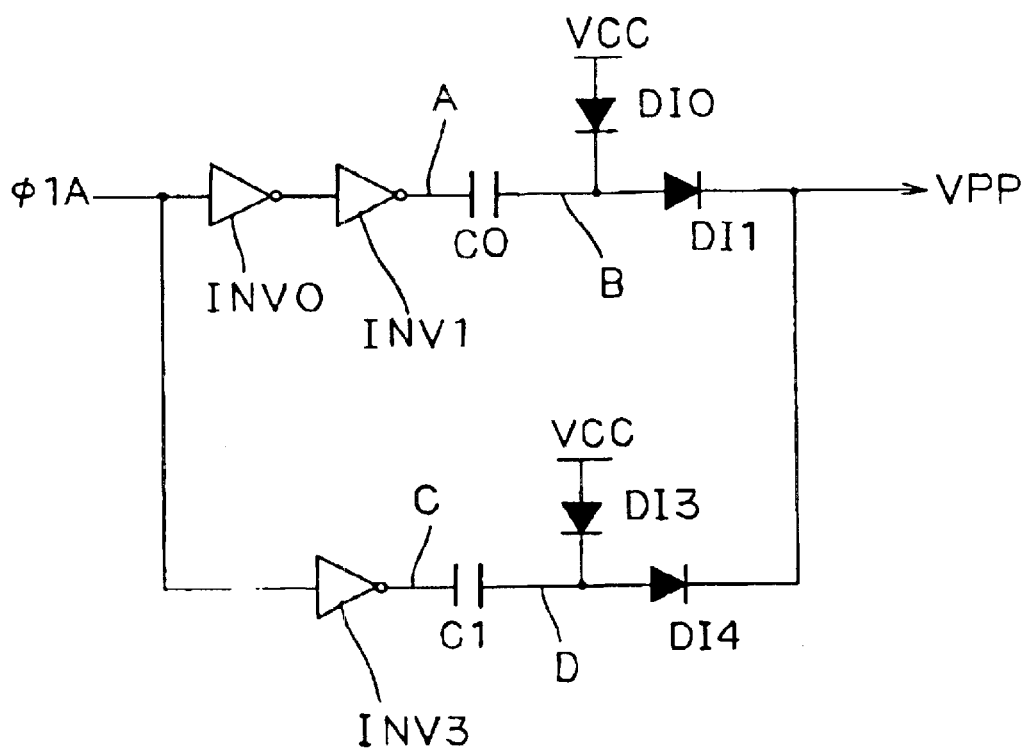
FIG. 13 is a circuit diagram showing another example of the configuration of each pumping circuit.
Figure 14:
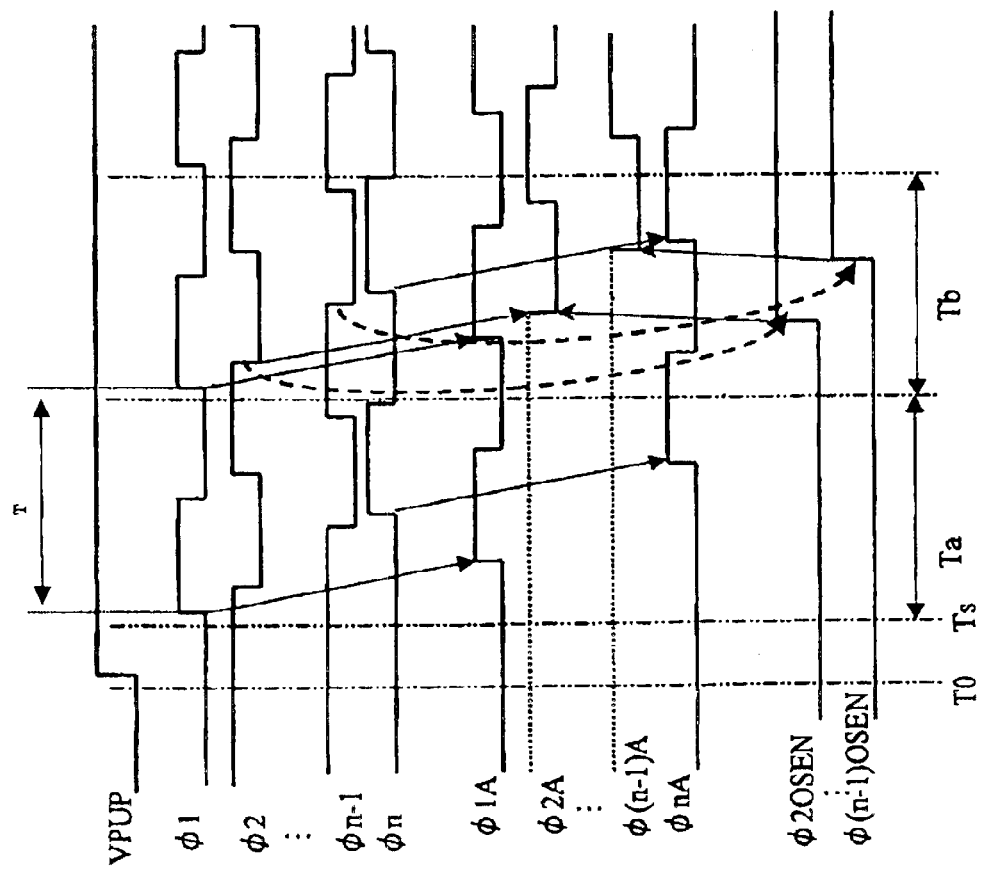
FIG. 14 is a timing chart showing the operation of the voltage boosting circuit in the embodiment of the present invention.

FIG. 13 is a circuit diagram showing another example of the configuration of the φ1–φn pumping circuits. All the φ1–φn pumping circuits are identical in configuration. In FIG. 14, the φ1 pumping circuit is shown as a representative. Referring to FIG. 14, the φ1 pumping circuit is constituted by the pumping circuit shown in FIG. 11 and a pumping circuit which operates at the edge other than the edge at which the pumping circuit shown in FIG. 11 operates, the two pumping circuits being connected in parallel. In the pumping circuit shown In FIG. 13, the boosting operation is performed at each of the rising and falling edges of signal φ1A.

Edge counter 70 is supplied with signals φ2–φ(n–1). After a start of oscillation of one of signals φ2–φ(n–1), edge counter 70 counts the number of oscillating signals. When the count value becomes a predetermined set value, edge counter 70 sends an enable signal. The predetermined set value can be set for each of signals φ2–φ(n–1). The logical sum of each enable signal and signal VPUP is obtained by the corresponding one of AND gates 62–6(n–1), and the logical sums thereby obtained are input respectively as signals φ2OSEN–φ(n–1)OSEN–the φ2–φ(n–1) latch circuits 32–3(n–1).

That is, each of φ2–φ(n−1) latch circuits 32–3(n−1) is supplied with the enable signal which rises with a delay that a predetermined set value times one cycle from the rising edge of signal VPUP. Oscillation of each of signals φ2A–φ(n−1)A is thereby started at a time after an arbitrary multiple of cycle T from signal VPUP. Starting of the boosting operation of each of the φ2–φ(n−1) pumping circuits 42–4(n−1) is also delayed by the arbitrary multiple of cycle T.

As described above, voltage boosting circuit 10 is arranged so that the boosting operation of each of the pumping circuits corresponding to signals freely set is delayed by an arbitrary number of cycles. The change in current at the time of starting of the operation of voltage boosting circuit 10 is thereby limited to reduce noise. For example, input characteristics of signal lines of a DRAM using voltage boosting circuit 10 can therefore be improved.

In voltage boosting circuit 10 of this embodiment, the timing of starting of the boosting operation of each pumping circuit is performed by counting the number of the edges of an oscillated signal. Therefore, the timing is not easily influenced by manufacturing process variations and does not vary easily.

Since voltage boosting circuit 10 of this embodiment is arranged to delay a start of the boosting operation of each pumping circuit by the number of cycles obtained by counting the number of the edges of an oscillating signal, the changing rate of current can be reduced during operation at any clock rate to obtain a satisfactory effect. In contrast, in a case where a start of the boosting operation of each pumping circuit is adjusted, for example, by a delay circuit, there is a possibility of failure to obtain a satisfactory effect, depending on a clock rate used.

While an example of delay of starts of the boosting operation corresponding to signals φ2–φ(n−1) has been described, the boosting operation to be delayed in corresponding to any of the signals and the amount of delay may be freely selected.

The operation of voltage boosting circuit 10 of this embodiment will be described.

FIG. 14 is a timing chart showing the operation of voltage boosting circuit 10 of this embodiment. FIG. 14 shows the waveforms of signals VPUP, φ1–φn, φ1A–φnA, and φ2OSEN–φ(n−1)OSEN.

Boosted level determination circuit 50 compares boosted voltage VPP and the desired set voltage at all times, and sets signal VPUP to "L" (GND level) when boosted voltage VPP is higher than the set voltage. Referring to FIG. 14, signal VPUP is at "L" at time T0. At this point in time, therefore oscillator circuit 20 does not oscillate to enable voltage boosting circuit 10 to operate.

When boosted voltage VPP becomes lower than the set voltage, boosted voltage level determination circuit 50 sets signal VPUP to "H". In the time period from time T0 in which signal VPUP changes from "L" to "H", as shown in FIG. 14, oscillator circuit 20 starts oscillating and voltage boosting circuit 10 starts the boosting operation.

When oscillator 20 starts oscillation, oscillating waveforms such as shown in FIG. 14 appear in signals φ1–φn.

Since φ1 latch circuit 31 uses signal VPUP as an enable signal, it directly supplies the oscillating waveform of signal φ1 as signal φ1A–φ1 pumping circuit 41 when signal VPUP becomes "H". Since φn latch circuit 3n also uses signal VPUP as an enable signal, it directly supplies the oscillating waveform of signal φn as signal φnA to φn pumping circuit 4n when signal VPUP becomes "H".

On the other hand, φ2–φ(n−1) latch circuits 32–3(n−1) use signals φ2OSEN–φ(n−1)OSEN as enable signals. Since each of signals φ2OSEN–φ(n−1)OSEN is a signal formed by delaying signal VPUP by an arbitrary multiple of cycle T, it does not become "H" immediately after signal VPUP has become "H". In time period Ta shown in FIG. 14, each of signals φ2OSEN–φ(n−1)OSEN is still at "L".

φ2–φ(n−1) latch circuits 32–3(n−1) hold the states of signals φ2A–φ(n−1)A when signals φ2OSEN–φ(n−1)OSEN are at "L". Therefore, signals φ2A–φ(n−1)A are not oscillating immediately after oscillating waveforms have appeared in signals φ2–φ(n−1).

The edge counter 70 counts the number of the edges of signals φ2–φ(n−1). When the count becomes the set value, the corresponding one of signals φ2OSEN–φ(n−1)OSEN changes from "L" to "H". This set value is set in advance to the number of cycles by which signal VPUP is to be delayed. In time period Tb shown in FIG. 14, each of signals φ2OSEN–φ(n−1)OSEN makes a transition from "L" to "H".

When one of signals φ2OSEN–φ(n−1)OSEN changes from "L" to "H", the corresponding one of the φ2–φ(n−1) latch circuits 32–3(n−1) directly supplies the corresponding one of signals φ2–φ(n−1) as the corresponding one of signals φ2A–φ(n−1)A to the corresponding one of pumping circuits 42–4(n−1).

Figure 15:
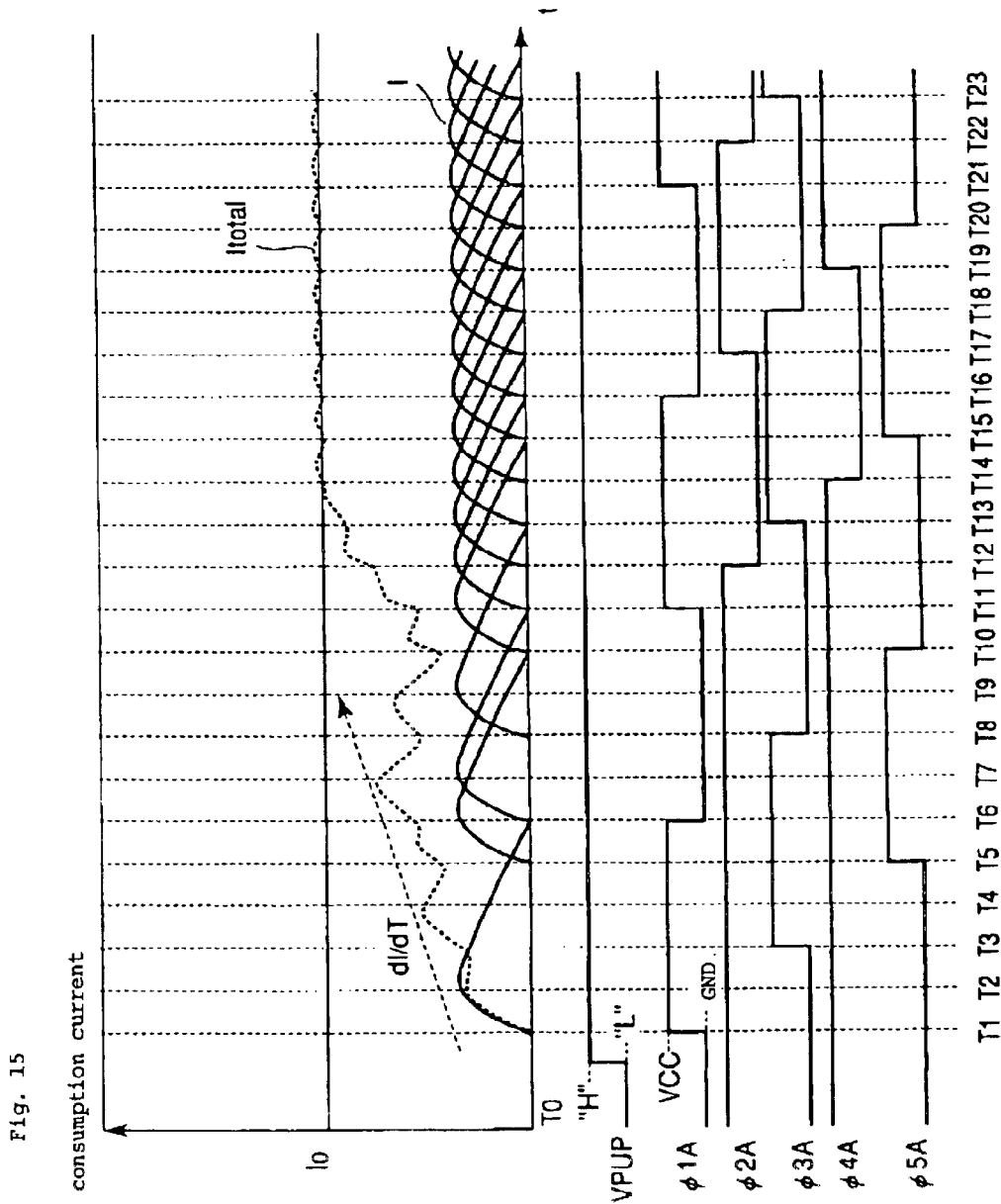
FIG. 15 is a timing chart showing the waveforms of signals in the voltage boosting circuit in the embodiment of the present invention.

FIG. 15 is a timing chart showing the waveforms of the signals in the voltage boosting circuit of this embodiment. FIG. 15 shows an example of the circuit in which n=5 and in which edge counter 70 operates only for signals φ2 and φ4 to start oscillation of signals φ2A and φ4A with a delay of only one cycle. It is also assumed that the pumping circuit shown in FIG. 13 is used to enable the voltage boosting circuit to operate not only at the times of transition of signals φ1A and φ5A from reference voltage GND to external power supply voltage VCC but also at the times of transition from external power supply voltage VCC to reference voltage GND.

In the lower section of FIG. 15, the waveforms of signal VPUP and φ1A–φ5A are shown. In the upper section of FIG. 15, currents I (solid line) sent from φ1–φ5 pumping circuits 41–45 and a current Itotal (dotted line) obtained by combining currents I are shown.

Referring to FIG. 15, signal VPUP makes a transition from "L" to "H" in the time period from time T0 to time T1 to start the boosting operation. Signals φ1A, φ3A, and φ5A make transitions (rise) at times T1, T3, and T5, respectively, to start oscillation. Signals φ2A and φ4A do not make transitions (fall) at times T2 and T4 but are delayed by one cycle by the edge counter 70 to start oscillation until times T12 and T14.

In response to the transitions of signals φ1A–φ5A, transitions of currents I sent from φ1–φ5 pumping circuits 41–45 are made, as indicated by the solid line in FIG. 15. Current Itotal (indicated by the dotted line in FIG. 15) obtained by combining the outputs from φ1–φ5 pumping circuits 41–45 rises gradually in the time period from time T1 to time T13 to reach a saturated consumption current I0 at time 14, and is constantly maintained thereafter.

Figure 1:
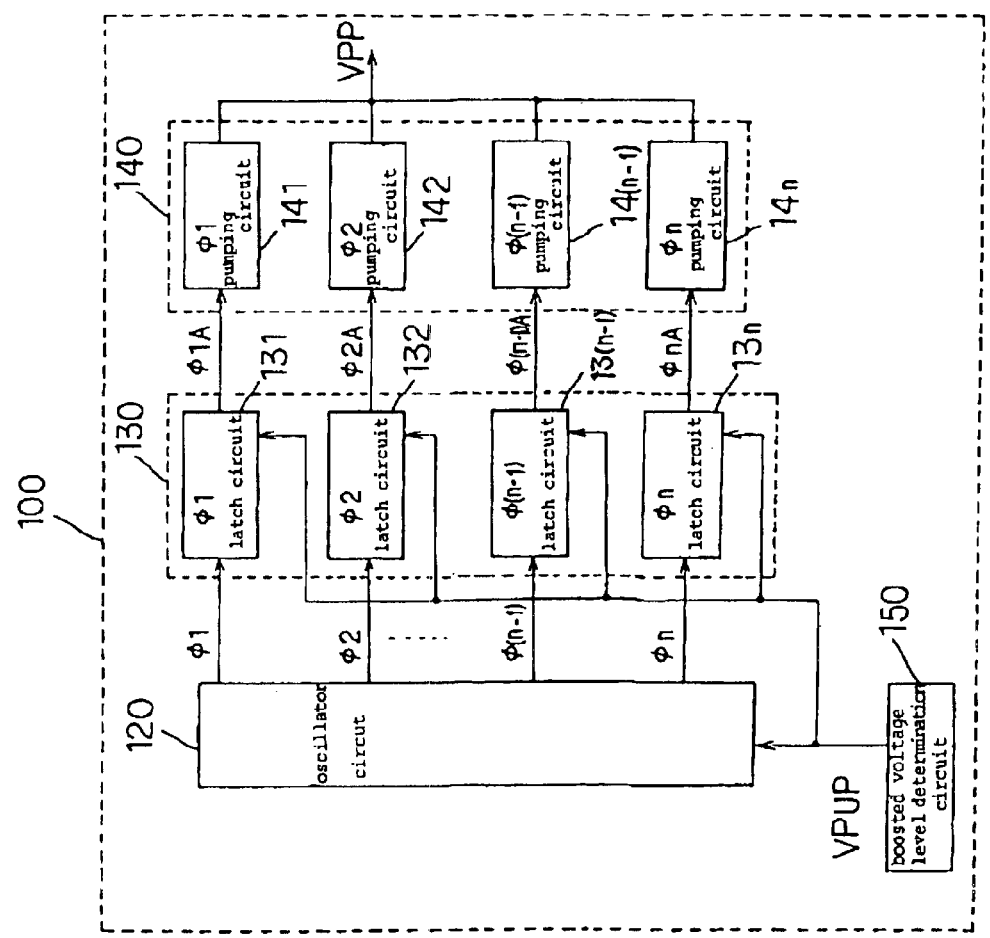
FIG. 1 is a circuit diagram showing the configuration of a conventional voltage boosting circuit.
Figure 2:
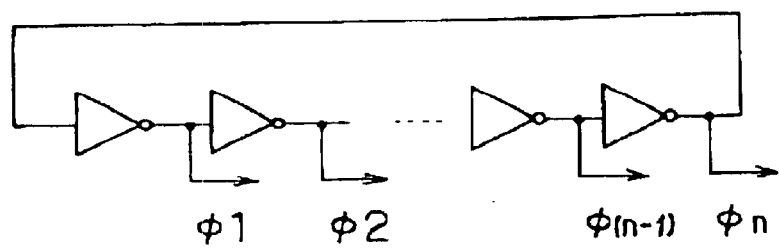
FIG. 2 is a circuit diagram showing an example of a basic configuration of an oscillator circuit shown in FIG. 1.
Figure 3:
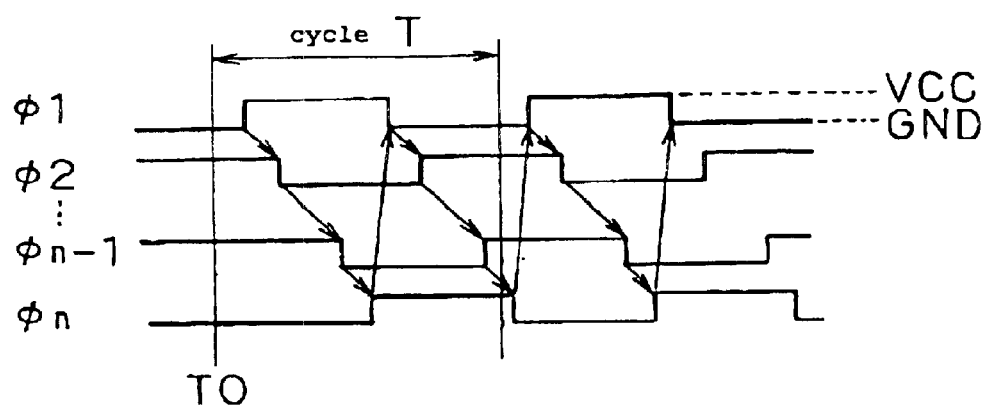
FIG. 3 is a timing chart showing the waveforms of oscillating signals of the oscillator circuit shown in FIG. 1.
Figure 4:
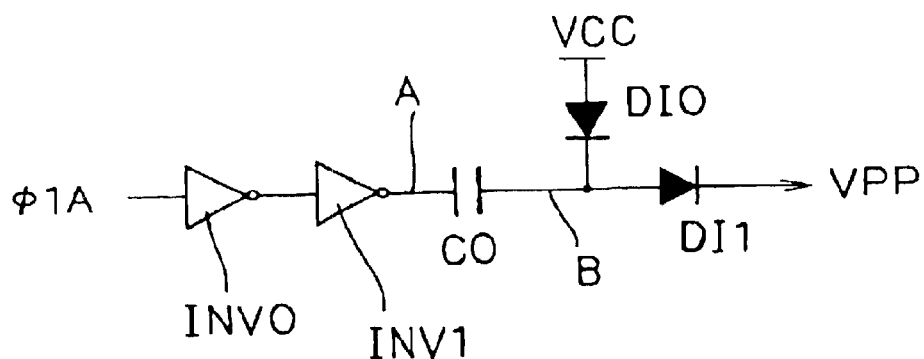
FIG. 4 is a circuit diagram showing an example of the configuration of each of pumping circuits shown in FIG. 1.
Figure 5:
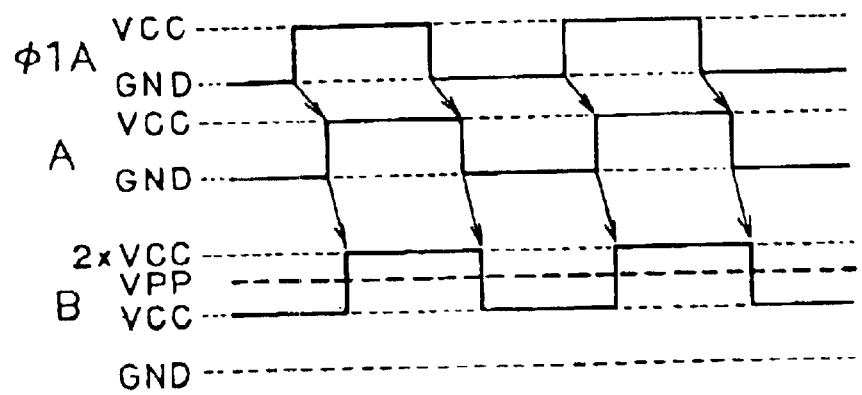
FIG. 5 is a timing chart showing the boosting operation of the pumping circuit shown in FIG. 4.
Figure 6:
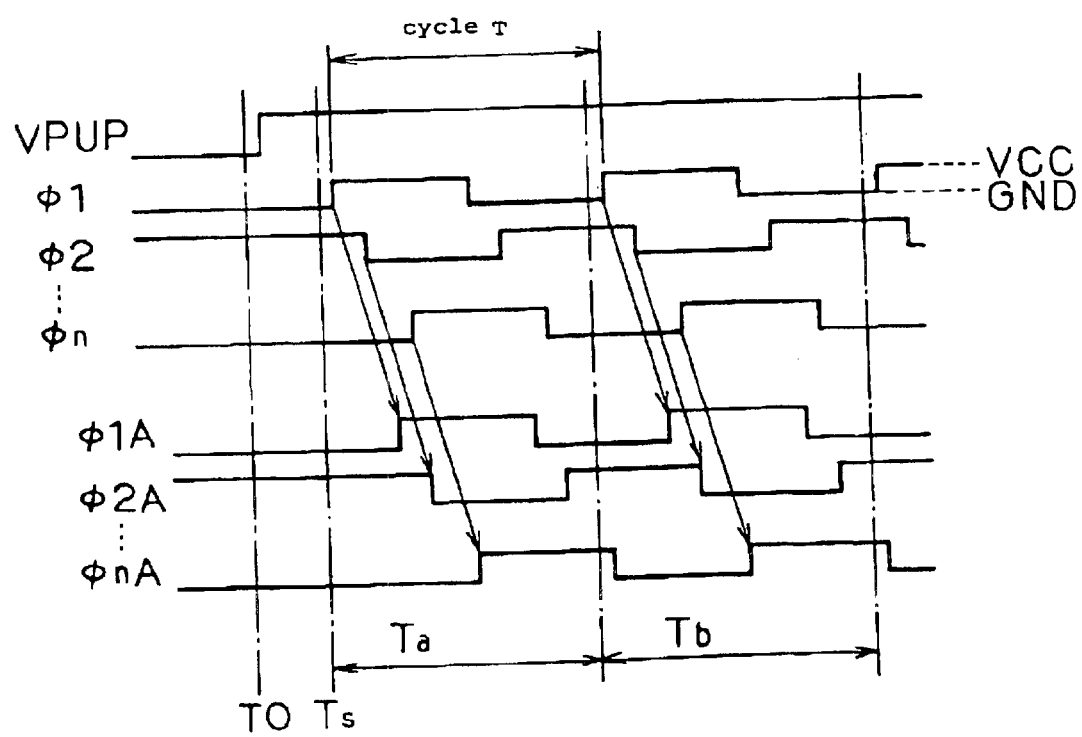
FIG. 6 is a timing chart for explaining the operation of the conventional voltage boosting circuit.
Figure 7:
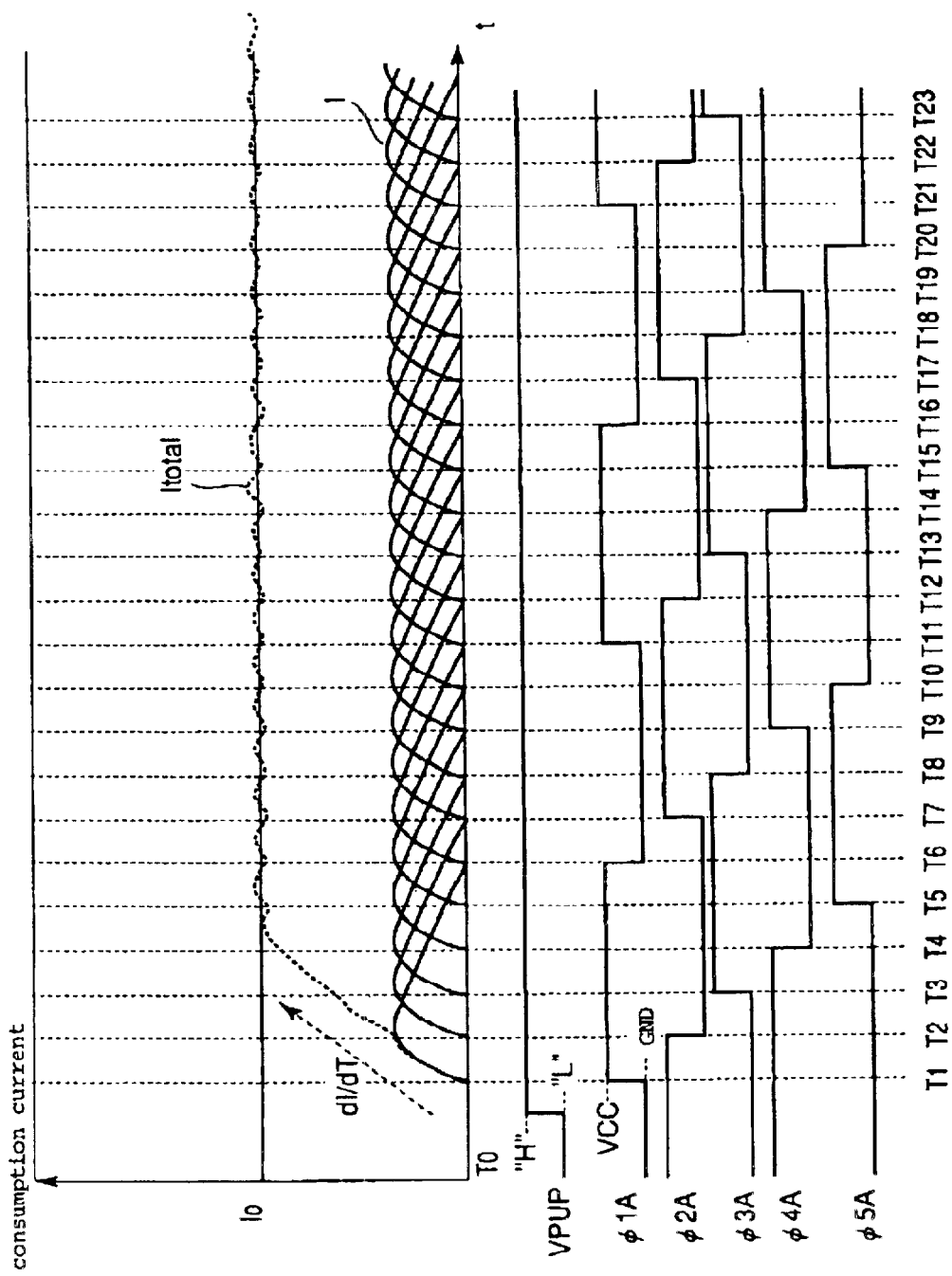
FIG. 7 is a timing chart showing the operation of the conventional voltage boosting circuit and the waveform of the output signal.

The saturated consumption current I0 shown in FIG. 15 has the same value as the saturated consumption current I0 in the example of the conventional art shown in FIG. 7. In the conventional art shown in FIG. 7, current Itotal increases abruptly in the time period from time T1 to time T5 to reach saturated consumption current I0. In contrast, in the case of this embodiment shown in FIG. 15, current Itotal increases gradually in the time period from time T1 to time T13 to reach saturated consumption current I0. That is, it can be understood that the changing rate of current dI/dT immediately after a start of the boosting operation is limited to a smaller value in this embodiment.

In voltage boosting circuit 10 of this embodiment, as described above, arbitrary ones of a plurality of oscillated signals sent from oscillator circuit 20 at the time of a start of the operation are delayed by arbitrary numbers of cycles by latch circuits 31–3n supplied with enable signals from the edge counter 70 which counts the number of the edges of each oscillated signal. The times at which the boosting operations of pumping circuits 41–4n are started are thereby shifted relative to each other to reduce the changing rate of current, thereby reducing noise. For example, the input characteristics of signal lines of a DRAM using voltage boosting circuit 10 are thereby prevented from being badly influenced by noise.

In voltage boosting circuit 10 of this embodiment, starting of the boosting operation of pumping circuits 41–4n is controlled in synchronization with the cycles of the oscillating signals by edge counter 70 which counts the number of the edges of the oscillating signals. A different arrangement is conceivable in which input signals to the pumping circuits are generated by delaying signal VPUP by a delay circuit constituted by inverters in a plurality of stages. It is also conceivable that enable signals to the latch circuits are generated by delaying signal VPUP through a delay circuit.

However, there is a possibility of occurrence of variations in the abilities of the inverters in a transistor manufacturing process and it is difficult to obtain a predetermined amount of delay with accuracy by selecting the number of inverter stages. If the amount of delay as needed is not obtained, there is a possibility of the current changing rate dI/dT becoming large at a certain time to cause noise. It can therefore be said that voltage boosting circuit 10 of this embodiment capable of controlling the timing of starting of the boosting operations of the pumping circuits is advantageous in comparison with any voltage boosting circuit using a delay circuit.

Another embodiment of the present invention will be described with reference to the drawings.

Figure 16:
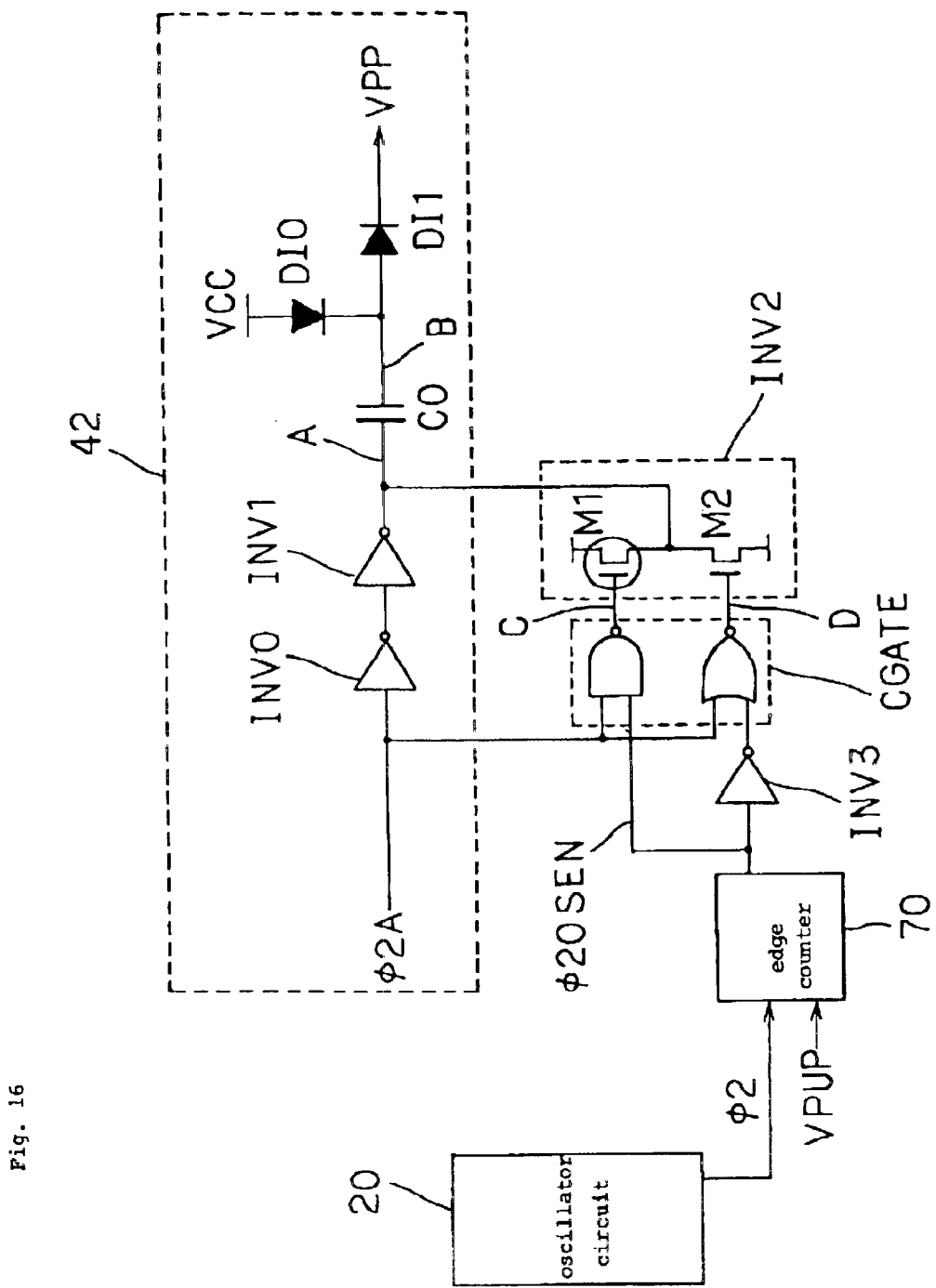
FIG. 16 is a circuit diagram showing the configuration of a voltage boosting circuit in another embodiment of the present invention.

FIG. 16 is a circuit diagram showing a voltage boosting circuit in another embodiment of the present invention. For ease of explanation, only portion of the voltage boosting circuit relating to signal φ2 of the signals sent from oscillator circuit 20 is illustrated in FIG. 16.

Referring to FIG. 16, the voltage boosting circuit has oscillator circuit 20, edge counter 70, φ2 pumping circuit 42, inverters INV3 and INV2 and gate CGATE. The voltage boosting circuit shown in FIG. 16 has a boosted voltage level determination circuit (not shown) for supplying VPUP signal, as does voltage boosting circuit 10 shown in FIG. 8. In the voltage boosting circuit shown in FIG. 16, a control Circuit for controlling the boosting power of pumping circuit 42 is constituted by inverters INV2 and INV3 and gate CGATE.

The voltage boosting circuit shown in FIG. 16 has circuits relating to signals φ1–φn, although only the portion relating to signal φ2 is illustrated.

Oscillator circuit 20, the boosted voltage level determination circuit, edge counter 70 and the φ1–φn pumping circuits are the same as those shown in FIG. 8.

inverter INV3 is a NOT gate which inverts signal φ2OSEN sent from edge counter 70.

Gate CGATE consists of a two-input NAND gate to which signal φ2A and signal φ2OSEN are input and a two-input NOR gate to which signal φ2A and an output from inverter INV3 are input.

An output terminal of the two-input NAND gate is connected to a connection point C. An output terminal of the two-input NOR gate is connected to a connection point D.

Inverter INV2 consists of p-channel transistor M1 and n-channel transistor M2 connected in series between external power supply voltage VCC and reference voltage GND. The gate of p-channel transistor M1 is connected to the connection point C, while the gate of the n-channel transistor M2 is connected to the connection point D. A connection point between the p-channel and n-channel transistors is connected to the connection point A in φ2 pumping circuit 42.

Figure 17:
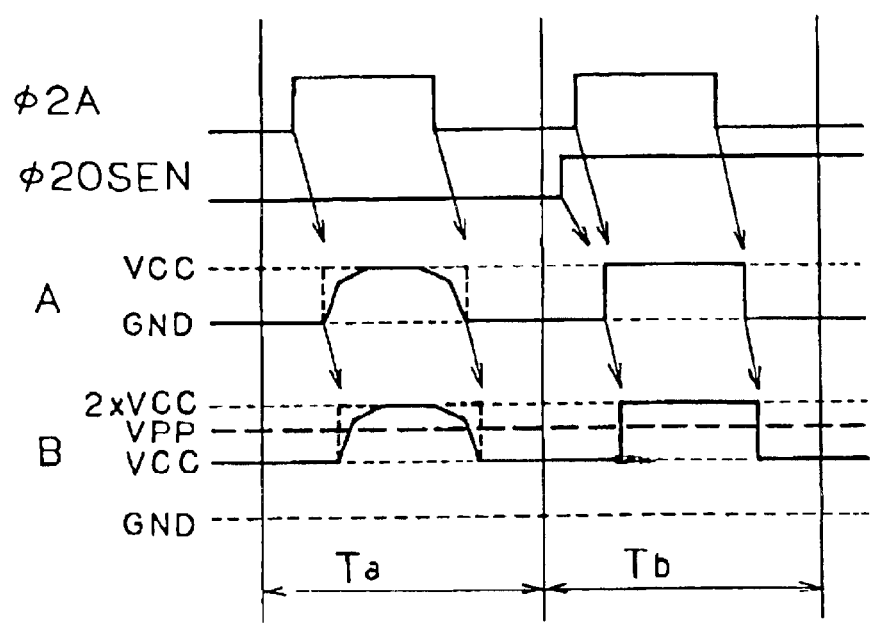
FIG. 17 is a timing chart showing the operation of the voltage boosting circuit shown in FIG. 16.

FIG. 17 is a timing chart showing the operation of the voltage boosting circuit shown in FIG. 16. FIG. 17 shows the waveforms of signals φ2A and φ2OSEN and waveforms at the connection points A and B immediately after a transition of signal VPUP from "L" to "H". The first one cycle of signal φ2 output from oscillator circuit 20 after the transition of signal VPUP from "L" to "H" is time period Ta, and the next cycle is time period Tb.

In time period Ta, signal φ2OSEN is at "L" and, therefore, the potentials at the connection points C and D corresponding to the output terminals of gate CGATE are "H" level and "L" level, respectively, even when signal φ2A is oscillating. Since p-channel transistor M1 and n-channel transistor M2 constituting gate INV2 are connected to the point C and the point D, respectively, inverter INV2 does not operate when signal φ2OSEN is at "L".

In time period Tb, signal φ2OSEN makes a transition from "L" to "H" and the signal φ2A oscillating operation is therefore transmitted to inverter INV2 through the outputs (connection points C and D) of gate CGATE.

When signal φ2A is "L", the inverter INV1 discharges the connection point A and the capacitor C0 to "L". Also, while the potential at the connection point C of the gate CGATE is "H" level, the potential at the connection point D becomes "H" level. Therefore the n-channel transistor M2 is turned on to enable the inverter INV2 to also act to discharge the connection point A and the capacitor C0 to "L".

Conversely, when signal φ2A is at "H", inverter INV1 acts to charge the connection point A and capacitor C0 to "H", and inverter INV2 also acts to charge them to "H". That is, when signal φ2OSEN is at "H", both inverters INV1 and INV2 charge or discharge the connection point A or capacitor C0.

Thus, in time period Tb, both inverters INV1 and INV2 charge or discharge the connection point A or capacitor C0. Therefore, when signal φ2A makes a transition from "L" to "H", and when it makes a transition from "H" to "L", the operation can be performed without blunting the waveforms at the connection points A and B if the current capacities of inverters INV1 and INV2 are adjusted in advance. On the other hand, in time period Ta, only inverter INV1 performs charging/discharging of the connection point A or capacitor C0. At this time, therefore, the waveforms at the points A and B are blunted in comparison with those in time period Tb. The amount of electric charge which can be supplied to boosted voltage VPP in time period Tb in which the boosting operation is performed by both inverters INV1 and INV2 is larger than that in time period Ta in which the boosting operation is performed by inverter INV1 alone. The current for charging/discharging of the connection point A or capacitor C0 in time period Tb is also larger than that in time period Ta, and the current changing rate dI/dT in time period Tb, considered to be a noise source, is also larger than that in time period Ta.

Consequently, in the voltage boosting circuit of this embodiment, it is possible to reduce noise by limiting the current changing rate at the time of starting of the operation in such a manner that the transistor size of inverter INV2 is adjusted and the time period corresponding to the number of cycles during which signal φ2OSEN (φ1–φnOSEN) is held at "L" after transition of signal VPUP from "L" to "H" is adjusted.

While preferred embodiments of the present invention have been described using specific terms, such description is for illustrative purposes only, and it is to be understood that changes and variations may be made without departing from the spirit or scope of the following claims.

What is claimed is:

1. A voltage boosting circuit comprising:
    an oscillator circuit which sends a plurality of oscillating signals differing in edge timing from each other;
    a plurality of pumping circuits provided in corresponding to the oscillating signals, each of which performs a boosting operation by charging and discharging a pumping capacitor by using the corresponding one of the oscillating signals, and which generate a boosted voltage by combining their outputs signals;
    a boosting power control circuit which controls the boosting power of each of said pumping circuits in response to an enable signal; and
    an enable circuit which counts the number of the edges of at least one of the oscillating signals, and which generates the enable signal to instruct said boosting power control circuit to reduce the boosting power of said pumping circuit until the count value becomes a set value.

2. The voltage boosting circuit according to claim 1, wherein said boosting power control circuit includes a plurality of latch circuits provided in corresponding to the oscillated signals, each of which stops and starts the corresponding one of said pumping circuits for the voltage boosting by stopping and starting transmission of the oscillating signal to said pumping circuit in response to the enable signal.

3. The voltage boosting circuit according to claim 1, wherein said boosting power control circuit controls the boosting power of each of said pumping circuits by changing, in response to the enable signal, drive power for charging and discharging the pumping capacitor in said pumping circuit.

4. The voltage boosting circuit according to claim 3, wherein said boosting power control circuit has an inverter for additionally charging and discharging the pumping capacitor, and controls the boosting power by controlling transistors constituting the inverter in response to the enable signal.

5. The voltage boosting circuit according to claim 1, wherein said enable circuit is capable of setting the set value for each of said pumping circuits.

6. The voltage boosting circuit according to claim 1, further comprising a boosted voltage level determination circuit which compares the boosted voltage with a set voltage and determines that the boosting operation should be started when detecting a state in which the boosted voltage is lower than the set voltage.

* * * * *